US012781961B2

(12) United States Patent
Arukhe et al.

(10) Patent No.: US 12,781,961 B2
(45) Date of Patent: Nov. 3, 2026

(54) MACHINE LEARNING FRAMEWORK FOR GAS FLARING AND EMISSION CONTROL

(71) Applicant: SAUDI ARABIAN OIL COMPANY, Dhahran (SA)

(72) Inventors: James Ohioma Arukhe, Dhahran (SA); Chijioke A. Alaku, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 303 days.

(21) Appl. No.: 18/744,785

(22) Filed: Jun. 17, 2024

(65) Prior Publication Data

US 2025/0383086 A1 Dec. 18, 2025

(51) Int. Cl.
*F23N 1/00* (2006.01)
*F23N 5/18* (2006.01)
*G05B 23/02* (2006.01)

(52) U.S. Cl.
CPC ............. *F23N 1/002* (2013.01); *F23N 5/184* (2013.01); *G05B 23/0283* (2013.01); *F23N 2223/44* (2020.01); *F23N 2223/48* (2020.01)

(58) Field of Classification Search
CPC ...... F23N 1/002; F23N 5/184; G05B 23/0283
USPC .................................................... 431/12, 202
See application file for complete search history.

(56) References Cited

U.S. PATENT DOCUMENTS

| | | | | |
|---|---|---|---|---|
| 4,139,339 | A | 2/1979 | Straitz, III | |
| 10,585,109 | B2 | 3/2020 | Farokhi et al. | |
| 2021/0071865 | A1 | 3/2021 | Johnson et al. | |
| 2021/0372864 | A1 * | 12/2021 | Tao | F01N 11/00 |

FOREIGN PATENT DOCUMENTS

| | | | |
|---|---|---|---|
| EP | 2440907 | B1 | 8/2017 |
| WO | 2021/242729 | A1 | 12/2021 |

OTHER PUBLICATIONS

Z. Sidaoui et al., "Application of Machine Learning in Wet Gas Measurement Predictions", 2022, https://www.researchgate.net/publication/358751428_Application_of_Machine_Learning_in_Wet_Gas_Measurement_Predictions.

(Continued)

*Primary Examiner* — Vivek K Shirsat
(74) *Attorney, Agent, or Firm* — Osha Bergman Watanabe & Burton LLP

(57) ABSTRACT

A method includes obtaining gas management data from a dynamic sensor array disposed within a gas processing plant, the gas processing plant including a gas flaring system. The method further includes obtaining a set of gas management parameters, and determining, with a machine learning model, a predicted emission of the gas flaring system based on the gas management data. The method further includes determining, based on the predicted emission, an emission reduction strategy and adjusting, with a gas processing controller and a gas flaring controller, the set of gas management parameters to execute the emission reduction strategy. Executing the emission reduction strategy includes directing a portion of feed gas from the gas processing plant to the gas flaring system according to the adjusted set of gas management parameters and flaring, using the gas flaring system, the portion of the feed gas according to the adjusted set of gas management parameters.

20 Claims, 7 Drawing Sheets

(56) References Cited

OTHER PUBLICATIONS

Zhao, Zhiyue, et al., "The Gas-Liquid Flow Rate Measurement Based on Multisensors and Machine Learning," IEEE Sensors Journal, vol. 22, No. 17, 2022 (9 pages).
Khalid, Azad, et al., "Gas Flaring, Composition, Emission, Measuring, Environmental Impacts and Recovery Methods: An Overview," 2023, 10.14704/nq.2022.20.8.NQ44888 (19 pages).
Mask, Gene, et al., "An improved model for gas-liquid flow pattern prediction based on machine learning," Journal of Petroleum Science and Engineering, 2019 (13 pages).
Wu, Wei, et al., "Monitoring gas flaring in Texas using time-series sentinel-2 MSI and landsat-8 OLI images," International Journal of Applied Earth Observations and Geoinformation, 2022 (12 pages).

* cited by examiner

MACHINE LEARNING FRAMEWORK FOR GAS FLARING AND EMISSION CONTROL

BACKGROUND

Gas flaring is a common practice at oil refineries, chemical and petrochemical plants, gas processing plants, and other industrial settings whereby excess gas that cannot be processed or contained is burnt off. A consequence of gas flaring is the emission of pollutants, notably carbon dioxide, a significant greenhouse gas. Precise monitoring of gas flaring is essential for environmental protection and regulatory compliance. Flare gas monitoring is notoriously challenging due to dynamic variability in gas composition, wide flow rate ranges, and the presence of particulates. These challenges complicate compliance with environmental regulations and hinder effective process control. Accordingly, there is a need to produce reliable systems and methods for monitoring gas flaring operations and controlling the emission that results from gas flaring.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for performing gas flaring. The method includes obtaining gas management data from a dynamic sensor array disposed within a gas processing plant, the gas processing plant including a gas flaring system. The method further includes obtaining a set of gas management parameters, where the set of gas management parameters define, at least in part, operation of the gas processing plant and gas flaring system, and determining, with a machine learning (ML) model, a predicted emission of the gas flaring system based on the gas management data. The method further includes determining, based on the predicted emission, an emission reduction strategy and adjusting, with a gas processing controller and a gas flaring controller, the set of gas management parameters to execute the emission reduction strategy. Executing the emission reduction strategy includes directing a portion of feed gas from the gas processing plant to the gas flaring system according to the adjusted set of gas management parameters and flaring, using the gas flaring system, the portion of the feed gas according to the adjusted set of gas management parameters.

Embodiments disclosed herein generally relate to a system for performing gas flaring at a gas processing plant comprising a gas flaring system. The system includes a gas processing controller communicatively coupled to the gas processing plant and a gas flaring controller communicatively coupled to the gas flaring system. The gas processing controller and gas flaring controller are configured to adjust a set of gas management parameters, the set of gas management parameters defining, at least in part, operation of the gas processing plant and gas flaring system. The system further includes a dynamic sensor array disposed within the gas processing plant and gas flaring system, the dynamic sensor array configured to obtain gas management data from the gas processing plant and gas flaring system, and a computer communicatively coupled to the dynamic sensor array, the gas processing controller, and the gas flaring controller. The computer is configured to receive the gas management data from the dynamic sensor array, determine, with a machine learning (ML) model, a predicted emission of the gas flaring system based on the gas management data, determine, based on the predicted emission, an emission reduction strategy, and adjust, using the gas processing controller and the gas flaring controller, the set of gas management parameters to execute the emission reduction strategy. Executing the emission reduction strategy, according to the configuration of the system, includes directing a portion of feed gas from the gas processing plant to the gas flaring system according to the adjusted set of gas management parameters and flaring, using the gas flaring system, the portion of the feed gas according to the adjusted set of gas management parameters.

Embodiments disclosed herein generally relate to a non-transitory computer-readable memory including computer-executable instructions stored thereon that, when executed on a processor, cause the processor to perform the following steps. The steps include receiving gas management data from a dynamic sensor array disposed within a gas processing plant comprising a gas flaring system and receiving a set of gas management parameters. The set of gas management parameters define, at least in part, operation of the gas processing plant and gas flaring system. The steps further include determining, with a machine learning (ML) model, a predicted emission of the gas flaring system based on the gas management data, determining, based on the predicted emission, an emission reduction strategy, and adjusting, with a gas processing controller and a gas flaring controller, the set of gas management parameters to execute the emission reduction strategy. Executing the emission reduction strategy, according to the non-transitory computer-readable memory, includes directing a portion of feed gas from the gas processing plant to the gas flaring system according to the adjusted set of gas management parameters and flaring, using the gas flaring system, the portion of the feed gas according to the adjusted set of gas management parameters.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
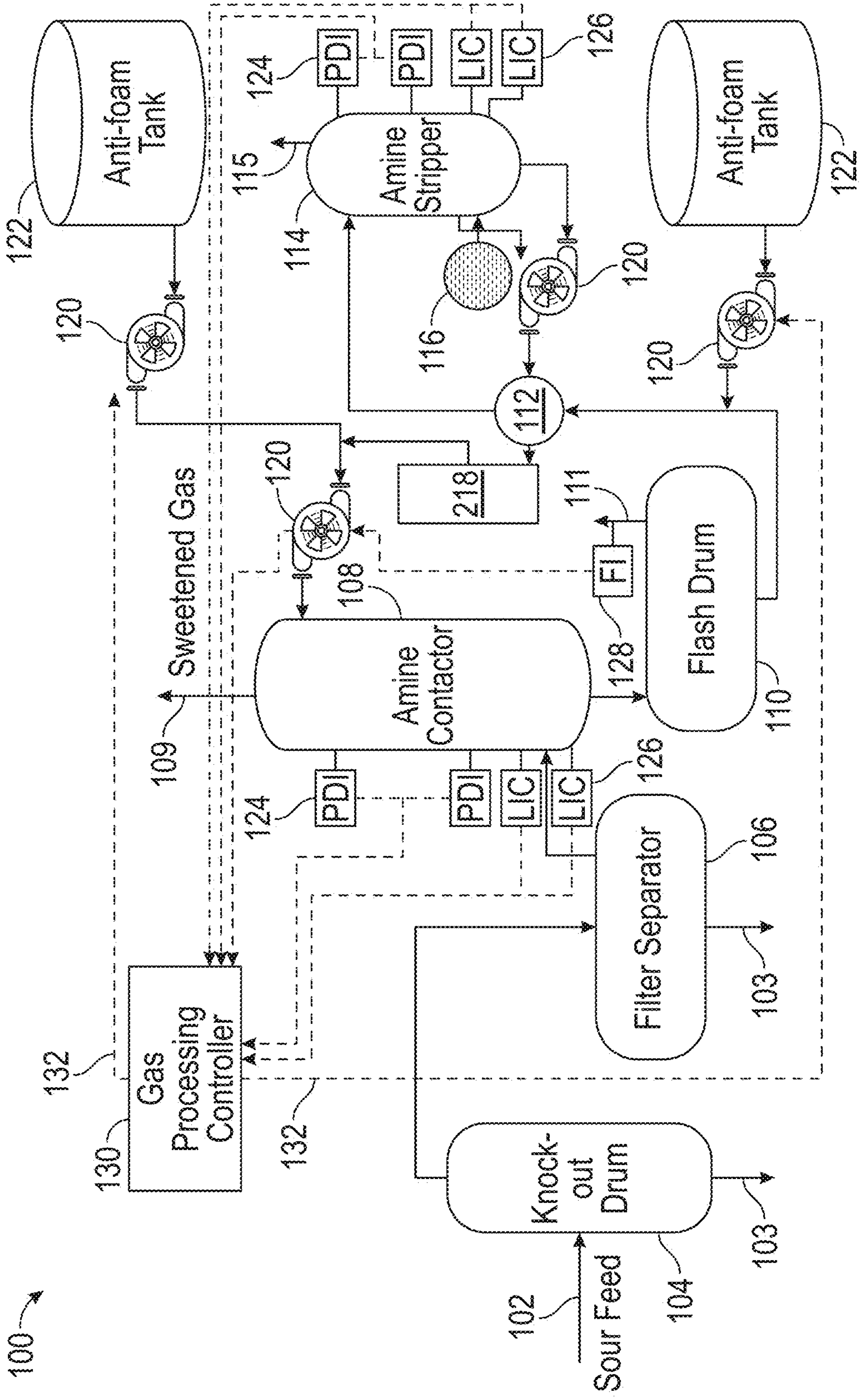
FIG. 1 depicts a gas processing plant in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein generally relate to systems and methods for performing gas flaring by monitoring and adjusting the operation of a gas flaring system to control emission therefrom. Gas flaring is the burning of gas at industrial facilities that cannot be process or contain the flared gas due to technical or economical reasons. A dynamic sensor array is used disposed to obtain gas management data from strategic locations within a gas flaring system of a gas processing plant. The dynamic sensor array is composed of pressure sensors, gas composition analyzers, flowmeters, temperature sensors, mass spectrometers, and moisture content sensors. The dynamic sensor array operates in real time, that is, on short time scales (e.g., every few seconds, every minute, every hour, every five hours, etc.). Operation of the gas processing plant and gas flaring system is defined, at least in part, by a set of gas management parameters.

In practice, it is difficult to directly measure the emission from gas burnt off by flaring systems. This is because the combusted gas exhibits extreme variations in temperature, pressure, and density. Moreover, combusted gas is often propelled at high velocities from the top of flare stacks. In one or more embodiments, a machine learning model (ML) may be used to determine a predicted emission of gas flaring system based on the gas management data. Due to the multifaceted nature of the gas management data, measuring a range of properties of the gas traversing the gas flaring system, and its temporal accuracy, the ML model can determine accurate predictions of the ongoing emission from the gas flaring system. The predicted emission may include a predicted composition of the emitted substance resulting from gas flaring and a predicted rate of emission (e.g., volume per unit time) or bulk volume of emission over a predetermined amount of time. Based on the predicted emission, an emission reduction strategy may be determined. An emission reduction strategy involves adjusting the operation of the gas processing plant or gas flaring system to reduce emission resulting from gas flaring. For example, the emission reduction strategy may include adjusting the air-to-gas ratio or the steam-to-gas ratio to improve combustion efficiency within the flare stack. To enact the emission reduction strategy, a gas processing controller and a gas flaring controller may be used to adjust the set of gas management parameters according to the emission reduction strategy. The portion of feed gas is then processed by the gas processing plant and flared by the gas flaring system according to the adjusted set of gas management parameters.

An example system in which embodiments disclosed herein may be applied is depicted in FIG. 1. Specifically, FIG. 1 depicts an example gas processing plant (100) in which gas flaring may be performed. However, it is emphasized that embodiments of the present disclosure are not limited to only to gas processing plants such as the gas processing plant (100) of FIG. 1. Gas flaring is also performed at oil refineries, chemical and petrochemical plants, offshore exploration platforms, wellheads at oil and gas wells, and landfills, for example. Thus, embodiments disclosed herein may be applicable to any of these facilities.

In some implementations, the gas processing plant (100) can receive a fluid (e.g., a gas mixture) from a pipeline. The gas processing plant (100) itself may be composed of many flowlines, pipes, or pipe grids, each conveying a fluid where the constituents and composition (e.g., relative concentrations of constituents) can change between pipelines as the received fluid is processed. In general, in the context of oil and gas, gas processing encompasses a wide range of industrial processes that seek to separate and extract desired gaseous hydrocarbons from an incoming contaminated fluid. The incoming fluid may be multiphase and be composed of many different solid, liquid, and gas constituents. Contaminants may include solids like sand, liquid like water or crude oil, and other gases. A gas processing plant may employ various "sub-processes," or methods and industrial processes, in series and/or in parallel. Additionally, the sub-processes may be arranged in a cyclical manner. Typically, each sub-process is governed by a set of control parameters. As a non-limiting example, control parameters may be the temperature of the environment of a sub-process, or the flow rate of a fluid, or the amount of a chemical additive used in a sub-process.

FIG. 1 depicts the flow of fluid through an example gas processing plant (100). One with ordinary skill in the art will recognize that gas processing plants (100) may be configured in a variety of ways according to plant-specific needs and applications. As such, the set of sub-processes shown in FIG. 1, and their arrangement, are non-limiting. Additionally, sub-processes are often associated with a mechanical device, such as a tank or a heat exchanger. For the purposes of FIG. 1, components of the gas processing plant (100), may be described according to their function (sub-process) or their mechanical form without undue ambiguity. In other words, a tank or a drum may herein be described as a sub-process or a mechanical device.

Contaminations in hydrocarbon (HC) feeds of a gas processing facility pose an ongoing challenge as they cause operational upsets resulting in increases of maintenance cost and loss of production. Early identification and quantification the level of the contaminations, or the composition of the flowing fluid in the HC feeds more generally, enables adequate preventive action to minimize operational upsets, reduce down time and maintenance cost as well as increase the productivity. Determination of the composition of a gas (i.e., the constituents of the gas and their concentrations) can be used to identify contaminates and undesired individual gases.

As shown in FIG. 1, a gas processing plant (100) receives an incoming contaminated fluid (102) via a flowline. In the context of gas processing, the incoming contaminated fluid (102) may be called the "sour feed." The incoming contaminated fluid (102) may be multiphase and be composed of a variety of solid, liquid, and gaseous constituents. For example, the incoming contaminated fluid (102) may contain solid particulates like sand, mineral precipitates such as pipe scale, and corroded pipe, liquid such as water, and gases like carbon dioxide (CO2) and hydrogen sulfide (H2S). In particular, H2S, in the presence of water, is highly corrosive and should be removed to prevent a leak in the pipeline. Additionally, the incoming contaminated fluid (102) may contain liquid and gas forms of various hydrocarbons.

In the example gas processing plant (100) of FIG. 1, the incoming contaminated fluid (102), or sour feed, is processed by a knock-out drum (104). The knock-out drum (104) performs bulk separation of gas and liquid. Liquid, separated from the incoming contaminated fluid (102), exits the knock-out drum (104) through a liquid exit (103).

From the knock-out drum (104), the bulk gas is processed by a filter separator (106). A filter separator (106) removes impurities such as mineral precipitates (e.g., pipe scale), water, liquid hydrocarbons, and iron sulfide from the fluid. A filter separator (106) uses filter elements, such as a replaceable sock or a coalescing filter, rather than mechanical components to separate out contaminants. According to the application, a filter separator (106) may be composed of one or two stages and may operate at high or low pressure. Again, the unwanted portions of the incoming contaminated fluid (102) exit the filter separator (106) through an exit (103).

After the filter separator (106), the incoming contaminated fluid (102) has been reduced to a gaseous stream. The gaseous stream undergoes another purifying sub-process through an amine contactor (108). An amine contactor (108) absorbs carbon dioxide (CO2) and/or hydrogen sulfide (H2S) contaminants from the gaseous stream. In general, an amine contactor (108), receives the partially processed incoming contaminated fluid (102), or gaseous stream, and a "lean" amine liquid. Common amines are diethanolamine (DEA), monoethanolamine (MEA), methyldiethanolamine (MDEA), diisopropanolamine (DIPA), and aminoethoxyethanol (Diglycolamine) (DGA). The contact between the gaseous stream and the lean amine liquid drives the absorption of CO2 and/or H2S into the amine liquid from the gaseous stream. As a result, decontaminated gas (109), also known as "sweetened gas," may exit the amine contactor (108). The decontaminated gas (109) should be checked to make sure it meets specifications. If the decontaminated gas (109) does not meet specifications, this is indicative that control parameters within the gas processing plant (100) require adjustment. The sub-processes of the knock-out drum (104), filter separator (106), and amine contactor (108) effectively transform the incoming contaminated fluid (102) to a decontaminated gas (109) and complete the objective of the gas processing plant (100). However, additional processes are required to maintain the gas processing plant (100) in an operational state. For example, the liquid amine that has absorbed the unwanted CO2 and H2S, which is called "rich" amine, is sent to an amine stripper for removal of its contaminants and re-conditioning.

As shown in FIG. 1, the contaminated amine is first sent to a flash drum (110). This sub-process consists of throttling the contaminated amines causing a pressure drop such that vapors are formed. The vapors exit the flash drum where they undergo further processing, such as being passed to an oxidizer. These steps have been omitted from FIG. 1 for brevity. Vapors from the flash drum may be expelled through the exit (111) to be re-processed by the amine contactor (108).

The remaining liquid contaminated amines enter a heat exchanger (112). The heat exchanger (112) recovers heat from the decontaminated amine leaving the amine stripper (114), which is described below. Consequently, the heat exchanger (112) heats the contaminated amine before entering the amine stripper (114).

The amine stripper (114) serves to remove the absorbed contaminants, such as H2S and CO2, from the amine solution so that it can be used again in the amine contactor (108). The amine stripper (114) is equipped with a reboiler (116). The amine stripper (114) contains a tray column consisting of a stripping section and a water wash section at the top. The reboiler (116) takes the amine solution located at the bottom of the amine stripper (114) and partially boils it. Steam (hot, gaseous water) is typically used as the heat source in the reboiler (116). Steam, typically sourced from the reboiler (116), flows up the column in the amine stripper (114) and contacts the contaminated amine solution flowing down within the column. As the contaminated amine contacts the steam, it is heated up and the contaminants are stripped out of the rich amine solution and flow to the stripping section of the column.

The stripped gases, commonly referred to as amine acid gas, leave the amine stripper through a stripped gas exit (115). The stripped gases undergo further processing, such as condensing out the water and passing the remaining acid gases to a sulfur recovery process, but these processes are not shown in FIG. 1 for brevity.

The decontaminated amine solution, leaving the bottom of the amine stripper (114), contains very low quantities of acid gas (such as H2S). This decontaminated amine solution may be recycled in a lean amine storage tank (not shown) and/or returned to the amine contactor (108). As shown in FIG. 1., the decontaminated amine solution leaving the amine stripper (114) is passed through the heat exchanger (112), to transfer heat to the contaminated amine solution leaving the flash drum (110). After passing through the heat exchanger (112), the decontaminated amine solution may be further cooled in a cooler (118) before being returned to the amine contactor (108).

The transport of the various fluids of the gas processing plant of FIG. 1 is facilitated by a plurality of pumps and/or compressors (120) disposed throughout the system. The type of pump or compressor (120), and the location may be altered and arranged according to plant-specific needs.

As noted above, it is emphasized that a gas processing plant (100) may implement different sub-processes and mechanisms for achieving adequate gas processing. Some sub-processes may include compression, stabilization, and dehydration. The gas processing plant (100) may also encompass the treatment of removed water for disposal through sub-processes such as filtration and deionization. Additionally, elements for heating and cooling may be provided to prevent the formation of hydrates, and mitigate corrosion and aid in dehydration, respectively. With respect to decontaminating the incoming contaminated fluid (102), other chemical and physical washes may be used without departing from the scope of this disclosure.

As shown in FIG. 1, the sub-processes may be monitored and controlled by a plurality of sensors and controllers. As an example, the amine contactor (108) and amine stripper (114) are both equipped with pressure differential indicators (PDI) (124) and level indicators (LIC) (126) in FIG. 1. Additionally, FIG. 1 depicts a flow indicator (FI) (128) connected to the exit of the flashed gases exiting the flash drum (110). The PDIs, LICs, and FIs, which are sensors, may send information regarding the pressure difference measured across sub-processes, the quantity and level of fluids present, and the flow rate of fluids, respectively, to a plurality of gas processing controllers (130). Flow indicators (FIs) disposed throughout the gas processing plant (100) may be multi-phase flow indicators.

The plurality of gas processing controllers (130) may herein be referred to as "controllers" or "controller" where appropriate. Gas processing controllers (130) may be distributed, local to the sub-processes and associated device, global, connected, etc. Gas processing controllers (130) may include a programmable logic controller (PLC), a distributed control system (DCS), a supervisory control and data acquisition (SCADA), and/or a remote terminal unit (RTU). For example, a programmable logic controller (PLC) may control valve states, fluid levels, pipe pressures, warning alarms, and/or pressure releases throughout a gas processing plant (100).

FIG. 1 also depicts anti-foam tanks (122) which contain an anti-foaming agent that may be injected, by use of a pump (120) and a controller (130), into different parts of the gas processing system as indicated by the dashed line (132). The anti-foam tanks (122) and injection of an anti-foaming agent into the sub-processes of the gas processing plant (100) may be necessary because a frequent problem in gas processing plants (100) is foaming. This problem is usually the result of improper operating conditions in the sub-processes in conjunction with the presence of contaminants. A common mitigative action is to inject an anti-foaming agent into the system.

While the sensors (124, 126, 128, and others not shown) and gas processing controllers (130) are necessary for safe and effective operation of a gas processing plant (100), in one or more implementations their effective use dependent on a determination of the composition of a gas at one or more locations (i.e., relative to bounding sub-processes) in the gas processing plant (100).

As stated, determining the composition of gases is essential to maintain and operate gas pipelines and grids (e.g., pipes used in a gas processing plant), ensure the components of gas pipelines and grids are within operational and safety limits, monitor gas quality, calculate calorific values of energy stored in the system gas, and ensure accurate custody transfer of gases during transportation. Further, the composition of the gas may be used to inform the optimal settings for other components (i.e., field devices) on the pipeline (e.g., choke valve) and/or the operation of a gas processing plant (100). Accordingly, pipelines may include devices along the flowline, or pipelines and or flowlines of gas processing plant (100), that assist in determining the composition of the gas, such as chemical sensors, gas chromatographs, mass spectrometers, and optical sensors, among others not listed.

The gas processing plant (100) may include various emergency relief lines leading to flare headers (not shown in FIG. 1). Emergency relief lines are designed to accommodate unplanned and abnormal situations in a gas processing plant (100), for example, when pressure, temperature, and other process parameters exceed safe limits. During such an unplanned situation, it is either technically or economically infeasible to retain or continue processing at least a portion of gas in the gas processing plant (100), depending on where the excess temperature or pressure (or variation in other process parameter) occurs. The emergency relief lines are used to direct excess gas through flare headers belonging to a gas flaring system in order to maintain safe operating conditions of the gas processing plant (100).

Figure 2:
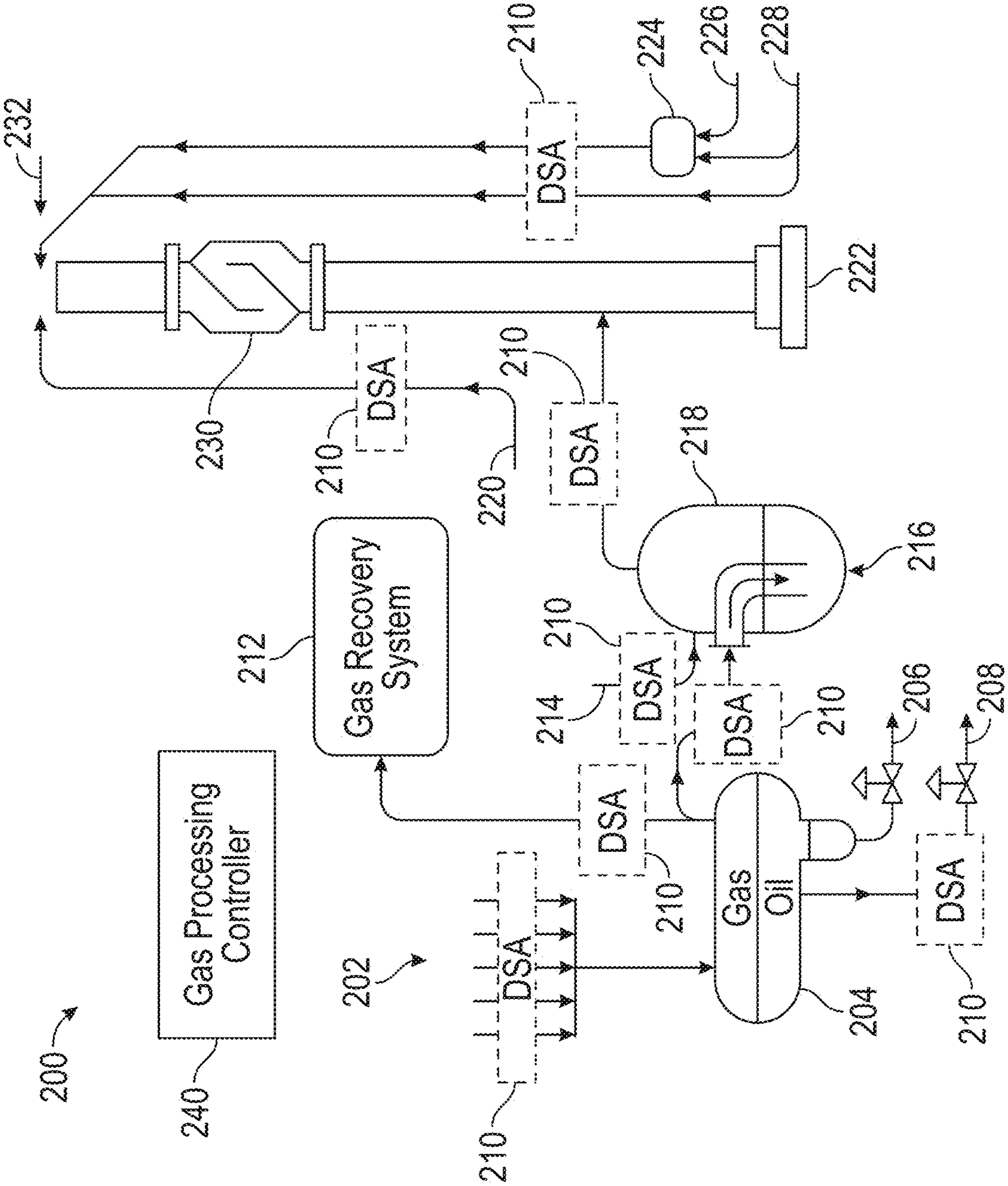
FIG. 2 depicts a gas flaring system in accordance with one or more embodiments.

FIG. 2 depicts a schematic illustration of a gas flaring system (200) in accordance with one or more embodiments. The arrows displayed in FIG. 2 illustrate the direction of flow of various fluids throughout gas flaring system (200). The fluid that reaches the gas flaring system (200) may be generically referred to as feed gas, although it is to be understood that the composition may include multiphase fluids as well as particulates. Feed gas enters the gas flaring system (200) through flare headers connected to the emergency relief lines (202) originating from the gas processing plant (100) and eventually reaches a flare stack (222). Similar to the gas processing plant (100), a liquid knockout drum (204) is used to separate liquids from gases. In some instances, oil and water may be gathered from the separated liquid for later use using a water drain (206) and an oil drain (208), respectively.

From the liquid knockout drum (204), the gaseous component of the feed gas may be split and flow in two different directions. The gaseous component of the feed gas may flow from the liquid knockout drum (204) in a first direction to a gas recovery system (212). The gas recovery system (212) may include compressor systems, such as liquid ring compressors and heat exchangers to enable the recovered gas to be safely stored. The gas recovery system (212) may be configured to direct gas back to the gas processing plant (100) or to storage facilities. The gaseous component of the feed gas may flow from the liquid knockout drum (204) in a second direction to a flashback seal drum (218). The general purpose of a flashback seal drum (218) is to prevent flames, in the event of an explosion or "flashback" within the flare stack (222), from entering portions of the gas flaring system (200) directly in fluid communication with the gas processing plant (100). As such, the flashback seal drum uses purge gas (214) that is injected into the flashback seal drum in order to maintain positive back pressure ensuring that no air or combustible mixture can flow back into the gas flaring system (200) from the flare stack (222). The makeup water (216) serves as a water seal to prevent both flames and other combustion products from traveling from the flare stack to other components of the gas flaring system (200).

The gaseous component of the feed gas travels from the flashback seal drum (218) into the flare stack (222) and is propelled upward toward the exit of the flare stack. The gas may traverse a flashback prevention section (230) which includes additional components for preventing flashback, or flames from an explosion, from entering the gas flaring system (200) from the flare stack (222). The flashback prevention section (230) may include a physical barrier, such as a flame arrestor of mesh screen, and may also utilize a pressure differential and velocity control to maintain the direction of flow towards the flare stack (222) exit. Fuel gas (228) and air (226) may also be directed through the flare stack to improve the combustion efficiency of the flowing gas combination. Inefficient combustion is a primary cause of hazardous material being ejected into the environment. In addition, steam (220) may be directed through the flare stack to promote smokeless burning, thereby reducing emission of particulates into the atmosphere. The gas combination is ignited using a spark ignition device (224) and propelled at high velocity through the flare stack exit in proximity to a pilot flame tip (232). The pilot flame tip (232) remains constantly lit in order to accommodate gas flaring operations as soon as they are needed. As the gas combination exits the flare stack (222), it is combusted by the pilot flame of the pilot flame tip (232) in a controlled burn.

Components of a dynamic sensor array (210), or DSA (210), may be deployed at various strategic locations throughout the gas flaring system (200). Depending on the location, the DSA (210) may include pressure sensors, gas composition analyzers, flowmeters, temperature sensors, mass spectrometers, and moisture content sensors. For example, components of the DSA (210) may be disposed along the emergency relief lines (202) to measure the temperature, pressure, composition, and rate of flow of the incoming feed gas. In addition, components of the DSA (210) may measure the rate of oil flow out of the liquid knockout drum (204) and the composition, temperature, pressure, and rate of flow of gas from the liquid knockout drum (204) to the gas recovery system (212) and flashback seal drum (218). Components of the DSA (210) may also measure the composition, temperature, pressure, and rate of flow of gas from the flashback seal drum (218) as well as properties of the steam (220), air (226), and fuel gas (228) injected into the flare stack (222). Due to the modularity of the DSA (210) components of the DSA (210) may be deployed at additional locations not shown in FIG. 2. For example, the DSA (210) may also include components deployed along the outside of the flare stack in order to measure environmental data, such as temperature, humidity, and wind speed. The DSA (210) may operate in real time, that is, on short time scales (e.g., every few seconds, every minute, every hour, every five hours, etc.). Measurements obtained from the DSA may be collectively referred to as gas management data.

Aspects of the gas flaring system (200) may be controlled by a gas flaring controller (240). Gas flaring controllers (240) may include a programmable logic controller (PLC), a distributed control system (DCS), a supervisory control and data acquisition (SCADA), and/or a remote terminal unit (RTU). For example, a programmable logic controller (PLC) may control valve states, fluid levels, pipe pressures, warning alarms, and/or pressure releases throughout a gas processing plant (100).

Gas management data, as measured by the dynamic sensor array, is used to monitor the operation of a gas flaring system, predict emission from the gas flaring system, and determine adjustments the operation of the gas flaring system to reduce emission according to methods described in greater detail below. In one or more embodiments, a machine learning (ML) model used to determine a predicted emission from the gas flaring system based on the gas management data. In other embodiments, the predicted emission may be determined using empirical look-up tables, or a database of laboratory measurements, of speed of sound and sound intensity attenuation for various gases and flowing conditions. One or more data processing techniques may be applied to the gas management data, such as measuring correlations through multivariate polynomial modeling, linear regression, and modeling according to other mathematical functions, for example.

Machine learning (ML), broadly defined, is the extraction of patterns and insights from data. The phrases “artificial intelligence”, “machine learning”, “deep learning”, and “pattern recognition” are often convoluted, interchanged, and used synonymously throughout the literature. This ambiguity arises because the field of “extracting patterns and insights from data” was developed simultaneously and disjointedly among a number of classical arts like mathematics, statistics, and computer science. For consistency, the term machine learning (ML), will be adopted herein, however, one skilled in the art will recognize that the concepts and methods detailed hereafter are not limited by this choice of nomenclature.

Machine learning (ML) model types may include, but are not limited to, neural networks, decision trees, random forests, support vector machines, generalized linear models, and Bayesian regression. ML model types are usually associated with additional “hyperparameters” which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model “architecture.” Generally, multiple model types and associated hyperparameters are tested and the model type and hyperparameters that yield the greatest predictive performance on a hold-out set of data is selected.

Figure 3:
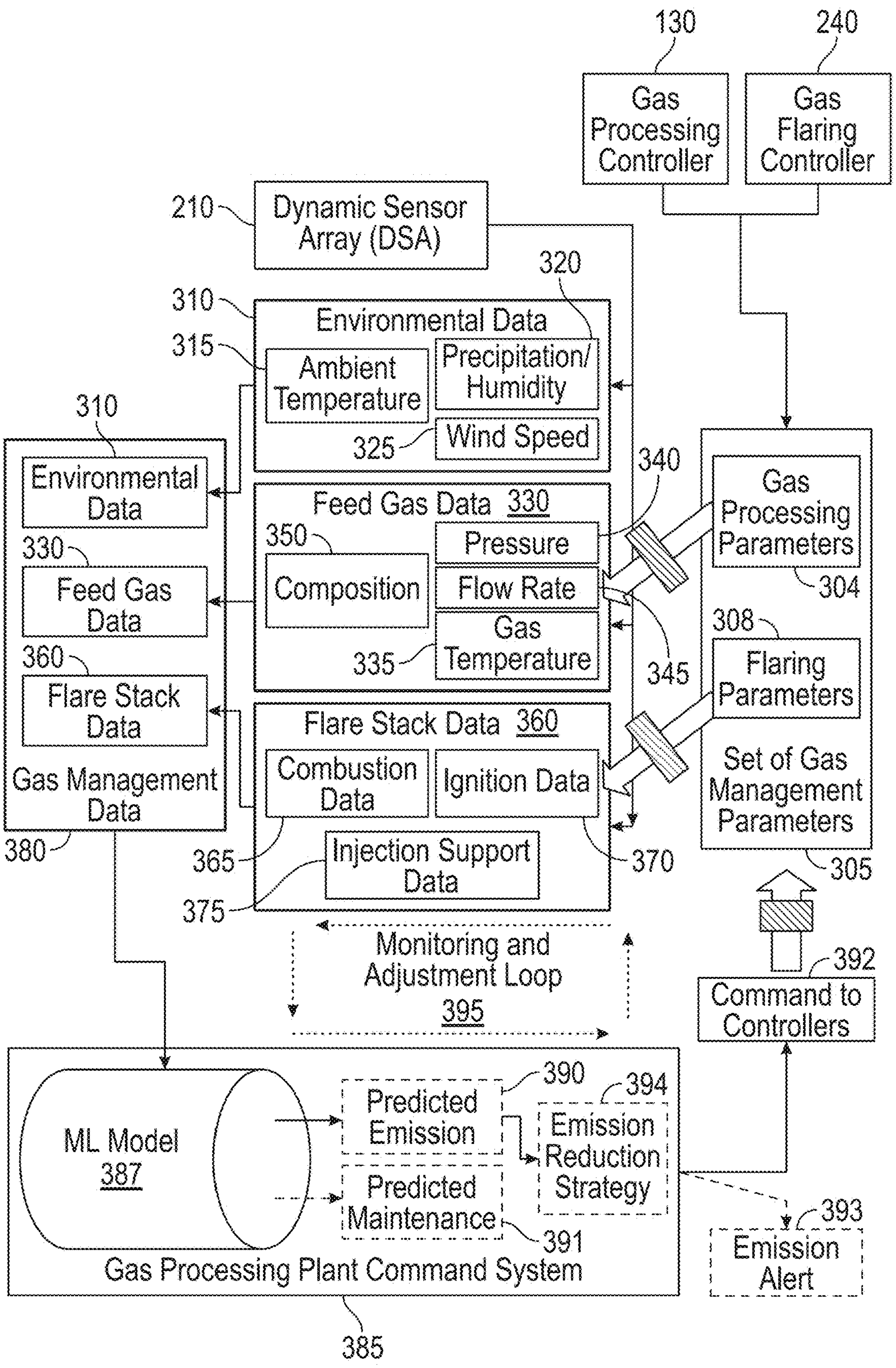
FIG. 3 depicts a system in accordance with one or more embodiments.

As noted, the objective of the ML model is to determine the predicted emission from the gas flaring system using the gas management data as measured by the dynamic sensor array disposed throughout the gas flaring system as described above. FIG. 3 provides a schematic diagram demonstrating interactions between the dynamic sensor array, machine learning model, gas processing plant, and gas flaring system in accordance with one or more embodiments. FIG. 3 shares common elements with FIGS. 1 and 2 though they need not be identical. As such, similar elements previously described are given the corresponding labels according to FIGS. 1 and 2.

As depicted in FIG. 3, the dynamic sensory array (210) obtains measurements from the gas flaring system. Measurements of the dynamic sensor array (210) may be categorized as environmental data (310), feed gas data (330), and flare stack data (360). Recall that one of the objectives of the systems and method of the present disclosure is to accurately predict the emission resulting from gas flaring.

Accordingly, the state of the environment may affect combustion reactions at the top of the flare stack. Environmental data (31) may therefore include measurements of the environment in the vicinity of the gas flaring system that may affect gas flaring operations. For example, the environmental data (310) may include ambient temperature (315), precipitation and humidity (320), and wind speed (325), among other possible measurements. Feed gas data (330) describes properties of the feed gas that reaches the flare stack of the gas flaring system. Feed gas data (330) may include measurements of feed gas pressure (340), flow rate (345), temperature (335), and composition (350). Flare stack data (360) describes properties of the flare stack in the gas flaring system. Flare stack data (360) may include combustion data (365) indicating the temperature, pressure, and flow rate of combusting material in the flare stack, ignition data (370) describing aspects of the pilot flame such as its height, diameter, and sparking efficiency, and injection support data (375) describing the amount of steam and air injected (e.g., as a volumetric rate or integrated volume over a predetermined amount of time) into the flare stack to support burning.

As described in reference to FIGS. 1 and 2, operation of aspects of the gas processing plant and gas flaring system may be controlled and affected by a gas processing controller (130) and gas flaring controller (240). The gas processing controller (130) and gas flaring controller (240) may be used to adjust the values of a set of gas management parameters (305) that define, at least in part, operation of the gas processing plant and gas flaring system. For clarity, the set of gas management parameters (305) may be categorized as gas processing parameters (304) and flaring parameters (308). However, in most instances, the gas flaring system is part of the gas processing plant and there may be overlap between categories. In addition, in one or more embodiments, the set of gas management parameters (305) may be categorized differently.

The gas processing parameters (304) may define the state of control valves, fluid levels, pipe pressures, heat exchangers, warning alarms, and/or pressure releases throughout the gas processing plant. Alternatively, or in addition, the gas processing parameters (304) may define the state of control valves, fluid levels, pipe pressures, heat exchangers, warning alarms, and/or pressure releases throughout the gas flaring system. In either case, manipulating the gas processing parameters (304) may result in changing qualities of the feed gas that reaches the gas flaring system. Consequently, the feed gas data (330) that is measured by the dynamic sensor array (210) may be different under different operational states defined by the gas processing parameters (304). To illustrate the influence of the gas processing parameters (304) on the feed gas data (330), a large arrow is shown in FIG. 3 pointing from the gas processing parameters (304) to the feed gas data (330).

The flaring parameters (308) may define the state of control valves, fluid levels, pipe pressures, heat exchangers, gas pumps, warning alarms, and/or pressure releases throughout the flare stack. The flaring parameters (308) may also define the state of control for devices associated with the flare stack and pilot flame, such as injectors responsible for providing steam, air, and fuel to the flare tip, the sparking device. Similar to the gas processing parameters (304), manipulating the flaring parameters may result in changing how gas is flared. Consequently, the flare stack data (360) that is measured by the dynamic sensor array (210) may be different under different operational states defined by the flaring parameters (308). To illustrate the influence of the flaring parameters (308) on the flare stack data (360), a large arrow is shown in FIG. 3 pointing from the flaring parameters (308) to the flare stack data (360).

Collectively, the data measured by the dynamic sensor array (210) may be referred to as gas management data (380). To reiterate, the gas management data (380) may include environmental data (310), feed gas data (330), and flare stack data (360). In one or more embodiments, the dynamic sensor array operates in real time to continuously obtain gas management data (380). By operating in real time, the dynamic sensor array may obtain gas management data (380) on short time scales (e.g., every second, every five seconds, every minute, every five minutes, every hour, every five hours, every day, etc.) to monitor the status of the gas processing plant and gas flaring system. The gas management data (380) is processed by a machine learning (ML) model 387) to determine a predicted emission (390) from the gas flaring system.

In accordance with one or more embodiments, the gas management data (380) may be pre-processed before being processed by the ML model (387). Pre-processing may include activities such as numericalization, filtering and/or smoothing of the data, scaling (e.g., normalization) of the data, feature selection, outlier removal (e.g., z-outlier filtering) and feature engineering. Feature selection includes identifying and selecting a subset of gas management data (380) with the greatest discriminative power with respect to determining the predicted emission (390) from gas flaring. For example, in one embodiment, discriminative power may be quantified by calculating the strength of correlation between elements of the gas management data (380). Consequently, in some embodiments, not all of the gas management data (380) need be passed to the ML model (387). Feature engineering encompasses combining, or processing, various computational model inputs to create derived quantities. The derived quantities can be processed by the ML model (387). For example, the gas management data (380) may be processed by one or more “basis” functions such as a polynomial basis function or a radial basis function. In some embodiments, the gas management data (380) are passed to the ML model (387) without pre-processing. Many additional pre-processing techniques exist such that one with ordinary skill in the art would not interpret those listed here as a limitation on the present disclosure.

Greater detail surrounding the ML model (387) will be described below and in the following description of FIGS. 4 and 5. In accordance with one or more embodiments, the gas management data (380), which may or may not be pre-processed, are processed by the ML model (387) to determine a predicted emission (390) from the gas flaring system. The predicted emission (390) may include a classification of the substance that is emitted as a result of flaring, for example, carbon dioxide (CO2), methane (CH4), black soot (or other particulates), nitrous oxide, and other pollutants such as sulfur dioxide, volatile organic compounds (VOCs), and trace metals. In addition to a classification, the prediction emission (390) may include an associated rate of emission for each substance emitted (e.g., as a volume or mass emitted per unit time). Each classified substance that is predicted to be emitted, as part of the predicted emission (390), may also have an associated probability or likelihood describing the uncertainty associated with the prediction.

In one or more embodiments, the ML model (387) may also determine a predicted maintenance (391) requirement of the gas flaring system or gas processing plant based on the gas management data (380). For example, by monitoring the gas management data (380), the ML model (387) may establish a history of safe operating conditions for the gas processing plant and gas flaring system. Significant deviations from the safe operating conditions, as determined by the ML model (387) and in view of the gas management data (380), may be indicative of a problem with either the gas processing plant or the gas flaring system. Depending on the element of the gas management data (380) that indicates a potential problem, the ML model (387) may determine a different predicted maintenance (391) requirement. For example, the flare stack data (360) that is part of the gas management data (380) may reveal that the air injected into the flare stack is not being injected with sufficient pressure. Accordingly, the predicted maintenance (391) may be to perform a repair of the air injection component of the gas flaring system. As another example, the feed gas data (330) that is part of the gas management data (380) may reveal that the flow rate (345) of the feed gas is too low. Accordingly, the predicted maintenance (391) may be to perform a repair of a pump responsible for the flow rate inside the gas processing plant or gas flaring system. A person of ordinary skill in the art will appreciate that many additional possibilities exist for the predicted maintenance (391).

In accordance with one or more embodiments, an emission reduction strategy (394) may be determined based on the predicted emission (390) from gas flaring. An emission reduction strategy describes a method to reduce predicted emission (390) by changing the operation of the gas processing plant or the gas flaring system. In one or more embodiments, the emission reduction strategy (394) is determined by the ML model (387). Emission from gas flaring is dependent on many factors including the feed gas composition, the air-to-gas ratio within the flare stack at the time of flaring, the design of the flare tip, the pressure inside the flare stack, the steam-to-gas ratio inside the flare stack, the flare stack height and diameter, the operational capacity of the gas recovery system (if the gas flaring system includes a gas recovery system), and operation of the ignition system in the flare stack. A person of ordinary skill in the art will appreciate that additional factors may influence the emission from gas flaring. For a given gas processing plant and gas flaring system, one or more of the aforementioned factors may be configurable according to the set of gas management parameters (305). For example, the flaring parameters (308), which may be part of the set of gas management parameters (305), may define and control the steam-to-gas ratio or the air-to-gas ratio (or both) inside the flare stack. The air-to-gas ratio is known to affect combustion efficiency at the flare tip. A low combustion efficiency results in incomplete combustion and possibly direct transmission of unburned hydrocarbons (such as methane and volatile organic compounds) into the environment. Combustion efficiency also affects the emission of carbon dioxide, particulate matter, and nitrogen oxides. Accordingly, an example emission reduction strategy (394) may include adjusting the flaring parameters (308) to increase an amount of air injected into the gas flaring system to improve combustion efficiency. As another example, the emission reduction strategy (394) may include adjusting the steam-to-gas ratio inside the flare stack to reduce the amount of smoke and particulate matter emitted into the environment. As a further example, the gas processing parameters (304) may define a pressure (340) of the feed gas, which may affect the predicted emission (390). A person of ordinary skill in the art will appreciate that additional emission reduction strategies (394) are possible depending on the set of gas management parameters (305).

Embodiments of the present disclosure also allow for an operator to determine an emission reduction strategy (394) using the predicted emission (390) as a guide. For example, by knowing the predicted emission (390), an operator may make an informed decision of how to adjust the operation of the gas processing plant or gas flaring system, or how to configure the set of gas management parameters (305), to reduce emission.

Below the capabilities of the ML model (387) are reiterated and further described. The ML model (387) integrates data from various sensors belonging to the dynamic sensor array (210) in real-time (i.e., on short time scales, for example, every minute, every 5 minutes, every hour, every 5 hours, up to and including timescales of days). This data integration allows for continuous monitoring and rapid response to changes in the gas flaring system, enhancing the model's ability to make accurate predictions and timely adjustments. For example, the ML model processes data from pressure sensors, gas composition analyzers, flow meters, temperature sensors, mass spectrometers, and moisture content sensors to generate comprehensive gas management data (380). In one or more embodiments, the ML model (387) uses adaptive learning techniques to improve its accuracy over time. This involves periodically updating the model based on new gas management data (380) to refine its predictions and recommendations. The ability of the ML model (387) to learn from new data helps it adapt to changes in gas composition, flow rates, and other dynamic variables, ensuring ongoing precision in predicted emission (390) and emission reduction strategies (394). In one or more embodiments, the ML model (387) determines a predicted maintenance requirement (391) by analyzing trends and anomalies in the gas management data. This proactive approach helps prevent system failures and maintain optimal operation. In this way, the ML model (387) can identify early signs of wear and tear or potential failures in the gas flaring system, allowing for timely maintenance and reducing downtime.

Again, many possible emission reduction strategies (394) may be determined by the ML model (387). Possible emission reduction strategies may include optimizing the air-to-fuel ratio, adjusting steam injection rates, or otherwise altering the set of gas management parameters based on predicted emission levels. In addition, the ML model (387) is capable of aiding in regulatory compliance by generating detailed reports on predicted and actual emissions. This functionality helps facilities demonstrate adherence to environmental regulations, providing both real-time and historical reports that can be used for regulatory submissions, audits, and internal reviews to ensure compliance with environmental standards.

In one or more embodiments, the ML model (387) is communicatively coupled to a user interface. For example, the ML model (387) may be implemented on a computer that is similar to the computer described in reference to FIG. 7, and the computer may include a user interface through which operators interact with the ML model (387). This interface may provide real-time alerts, visualizations of gas management data, and actionable insights, thereby allowing operators to monitor system status, receive alerts when emissions exceed thresholds, and implement recommended adjustments to mitigate emissions.

The utility of the ML model (387) described herein is not limited to gas processing plants but may also be used in various types of industrial facilities such as oil refineries and chemical plants. The ML model's (387) flexible architecture allows it to be customized for different types of facilities and operational requirements, making it a versatile tool for emission control in various industrial settings.

In one or more embodiments, the ML model (387) is part of a gas processing plant command system (385). The gas processing plant command system (385) is responsible for transmitting commands across the gas processing plant and gas flaring system. More specifically, the gas processing plant command system (385) may directly transmit instructions to the gas processing controller (130) and gas flaring controller (240). In accordance with one or more embodiments, the emission reduction strategy (394) determined based on the predicted emission (390) is used to construct a command to controllers (392). The command to controllers (392) includes instructions to adjust the set of gas management parameters (305) to execute the emission reduction strategy (394). Recall that the set of gas management parameters define, at least in part, operation of the gas processing plant and gas flaring system. Generally, executing the emission reduction strategy (394) includes directing a portion of feed gas from the gas processing plant to the gas flaring system according to the adjusted set of gas management parameters (305), and flaring, using the gas flaring system, the portion of feed gas according to the adjusted set of gas management parameters (305). Put differently, executing the emission reduction strategy (394) entails changing the operation of the gas processing plant and gas flaring system by adjusting the values of states of the set of gas management parameters (305). The command to controllers (392) is transmitted in real-time, or with a predetermined time delay, over a distributed network or through a physical mechanism for data transfer such as fiber optic cables via the gas processing plant command system (385) to the gas processing controller (130) and gas flaring controller (240).

The gas processing plant command system (385) may assume different forms according to one or more embodiments of the present disclosure. For example, the gas processing plant command system (385) may be a computer, such as the computer described in relation to FIG. 7, equipped with a controller similar to gas processing controller (130) or gas flaring controller (240). The gas processing plant command system (285) may accordingly include an RTU or PLC. However, the gas processing plant command system (385) need not be its own structure. For example, the gas processing plant command system (385) may be included by the gas processing plant or the gas flaring system. In addition, the gas processing plant command system (385) may be integrated with the gas processing controller (130) associated with the gas processing plant or with the gas flaring controller (240) associated with gas flaring system. In one or more embodiments, the gas processing plant command system (385) need not be physically associated with the gas processing plant. That is, in one or more embodiments, the gas processing plant command system (385) may be physically proximate to the gas processing plant although in other embodiments the gas processing plant command system (385) is physically distant from the gas processing plant. Consequently, the gas processing plant command system (385) may be used remotely to influence the operation of the gas processing plant and gas flaring system. The gas processing plant command system (385) may also enable an operator to manually transmit commands throughout the gas processing plant. To emphasize that the command to controllers (392) has a direct influence on the set of gas management parameters (305), a large arrow is depicted in FIG. 3 that points from the command to controllers (392) to the set of gas management parameters (305).

To summarize, the ML model (387) processes the gas management data (380), which may or may not be preprocessed, to determine a predicted emission (390). Based on the predicted emission (390), an emission reduction strategy (394) may also be determined. Subsequently, the gas processing plant command system (385) may be used (automatically, or manually by an operator) to transmit a signal or command to controllers (392) to the gas processing controller (130) and gas flaring controller (240). Recall that the values of the parameters in the set of gas management parameters (305) define several aspects of the operation of the gas processing plant and gas flaring system. The command to controllers (392) includes instructions to adjust the values of parameters belonging to the set of gas management parameters (305) according to the emission reduction strategy.

In one or more embodiments, an emission threshold may be predetermined, and a comparison may be made between the predicted emission (390) with the predetermined emission threshold. If the predicted emission (390) is greater the predetermined emission threshold, an emission alert (393) may be transmitted by the gas processing plant command system (385). For example, the predetermined emission threshold may define a threshold of carbon dioxide that should not be exceeded by the gas flaring system. During operation of the gas flaring system, a determination may be made of whether the predicted emission (390) is greater than the predetermined emission threshold, and in response to the determination that the predicted emission (394) is greater than the predetermined emission threshold, an emission alert may be transmitted. The emission alert (393) may be transmitted to operators, management personnel, nearby facilities, and environmental compliance agencies. The emission alert (393) enables an immediate and direct response to exceeding the predetermined emission threshold.

In one or more embodiments, the gas management data (380) and set of gas management parameters (305), are continuously monitored by the dynamic sensor array (210), the gas processing controller (130), and the gas flaring controller (240). Accordingly, the predicted emission (390) may be determined at any given moment in time, or across a predefined interval of time (e.g., the predicted emission (390) may be determined every minute, every hour, every six hours, or across any desired timescale, up to and including timescales of days or weeks).

In accordance with one or more embodiments, the operation of the gas processing plant and gas flaring system may be maintained as part of a monitoring and adjustment loop (395). The monitoring and adjustment loop (395) includes repeating the steps of obtaining the gas management data (380) and the set of gas management parameters (305), determining a predicted emission (390) based on the gas management data (380) using a machine learning model (387), determining an emission reduction strategy (394) based on the predicted emission (390), and adjusting the set of gas management parameters (305) to execute the emission reduction strategy (394). By design, the adjustment to the set of gas management reduces the predicted emission (390) of the gas flaring system. Thus, the monitoring and adjustment loop (395) may be used to maintain the gas processing plant and gas flaring system in a state of reduced emission, adapting to changes in the state of the gas processing plant and gas flaring system and always predicting emission (390) based on up-to-date conditions. Put differently, in one or more embodiments, the emission reduction strategy (394) is repeatedly determined according to the steps described above, and the emission reduction strategy (394) is repeatedly executed by adjusting the set of gas management parameters (305).

An example iteration of the monitoring and adjustment loop (395) is provided as follows. As previously described, the predicted emission (390) may include a classification of the emitted substance as well as the rate of its emission. If the prediction emission (390) indicates a large quantity of methane being emitted, for example, then the flare stack may be operating with a low combustion efficiency. In such a scenario, the emission reduction strategy (394) may include adjusting the pressure (340) of the feed gas or adjusting the air-to-gas ratio in the flare stack. Accordingly, the command to controllers (392) may include instructions to adjust the set of gas management parameters (305) such that the emission reduction strategy (394) of adjusting the pressure (340) of feed gas or adjusting the air-to-gas ratio is executed. As previously described, the set of gas management parameters (305) influence measurements obtained by the dynamic sensor array (210), and consequently adjusting the pressure (340) of the feed gas or the air-to-gas ratio will directly affect the gas management data (380) observed by the dynamic sensor array (210). Therefore, in order to continuously reduce the predicted emission (390) or maintain the predicted emission (390) at a particular value, the gas management data (380) may be reevaluated and processed by the ML model (387). After processing the new gas management (380), the ML model (387) may determine a new predicted emission (390) and subsequently a new a new emission reduction strategy (394). In this case, the command to controllers (392) would then be to adjust the set of gas management parameters (305) to execute the new emission reduction strategy (394).

The monitoring and adjustment loop (395) may also be used to calibrate the measurements obtained from the dynamic sensor array (210). As is well known in the art, the operating conditions of a gas flaring system may change dramatically, for example, between ordinary operation of the gas processing plant and emergency ejection of gas through the emergency relief lines. Moreover, some sensors (e.g., pressure sensors, flowmeters, temperature sensors, composition analyzers) are well-suited for a particular range of operation conditions but not for others. In other words, the quality of measurements from particular sensors depends on the dynamic range of the conditions. The monitoring and adjustment loop (395) can be used to continuously provide a suite of measurements from the dynamic sensor array (210) including measurements of environmental data (310), feed gas data (330), and flare stack data (360). The continuous stream of information may allow for the ML model (387) to adjust the interpretation of the measurements from the dynamic sensor array (210) thereby calibrating the measurements for a more accurate determination of the predicted emission (390).

Continuing with calibration of the dynamic sensor array (210), sensors in the dynamic sensor array (210) (e.g., pressure sensors, flow meters, temperature sensors, and gas composition analyzers), are typically factory-calibrated against known standards. This initial calibration ensures that the sensors provide accurate measurements within their specified operating ranges. Once installed, the sensors may undergo an on-site calibration to account for the specific conditions and configurations of the gas flaring system and gas processing plant. This step involves adjusting the sensor outputs to match reference measurements taken under controlled conditions. The ML model (387) can include self-calibration algorithms that continuously adjust the sensor outputs based on real-time data. These algorithms use historical data and expected patterns to detect and correct sensor drift or deviations. The ML model (387) can dynamically adjust the interpretation of sensor data based on the operating conditions. For example, during normal operation, the sensors may measure within a specific range, but during emergency ejections, the conditions may change dramatically. The model can adjust the calibration factors to maintain accuracy across different ranges. The dynamic sensor array (210) may include redundant sensors for critical measurements. Cross-validation between these sensors helps detect inconsistencies or faults in the readings. For example, if two flow meters provide different readings, the ML model (387) can flag this discrepancy for further investigation or adjustment. Combining data from multiple sensors using the dynamic sensor array (210) and measuring different parameters (e.g., pressure, temperature, and composition) allows for a more comprehensive validation. Discrepancies between related measurements can be used to identify calibration issues. Regular maintenance schedules (including predicted maintenance (391) requirements) may include manual calibration checks using external reference standards or calibration gases. These checks ensure that the sensors remain accurate over time and help correct any long-term drifts that automatic calibration may not fully address. During operation, detailed calibration reports may be generated to document the calibration status of each sensor in the dynamic sensor array (210). These reports include the calibration date, method, and any adjustments made, ensuring traceability and compliance with regulatory requirements.

As part of the monitoring and adjustment loop (395), the ML model (387) may continuously monitor the gas management data (387) for anomalies that may indicate sensor calibration issues. For example, sudden spikes or drops in sensor readings that do not correlate with other data can trigger a recalibration process. If the ML model (387) detects significant calibration issues that could affect the accuracy of the predicted emission (390), it can generate real-time alerts for operators. These alerts prompt immediate investigation and corrective action and may be enacted similarly to the emission alert (393) described previously. In one or more embodiments, calibration adjustments and sensor performance data are logged continuously. This log helps in tracking the sensor performance over time and provides data for retrospective analysis during troubleshooting or audits.

The monitoring and adjustment loop (395) may continue as described above for a predetermined number of iterations or may be repeated after a predetermined length of time (i.e., may be implemented according to a predefined frequency or periodicity). A person of ordinary skill in the art will recognize that the above example is merely illustrative and is not limiting to the capabilities of the methods and systems of the present disclosure. During the monitoring and adjustment loop (395), the predicted emission (390) may vary resulting in a variety of emission reduction strategies (394).

Figure 4:
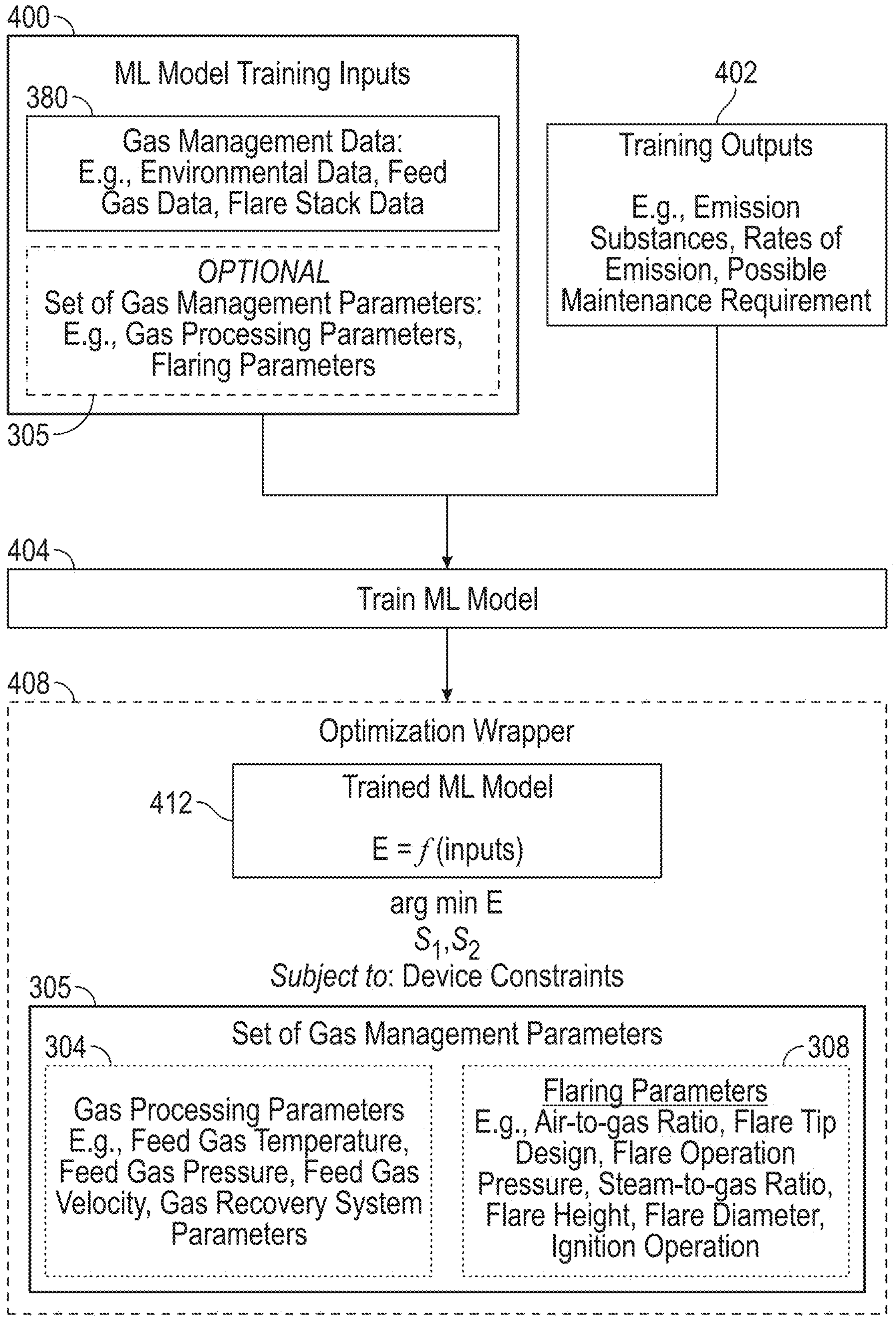
FIG. 4 depicts a system in accordance with one or more embodiments.
Figure 5:
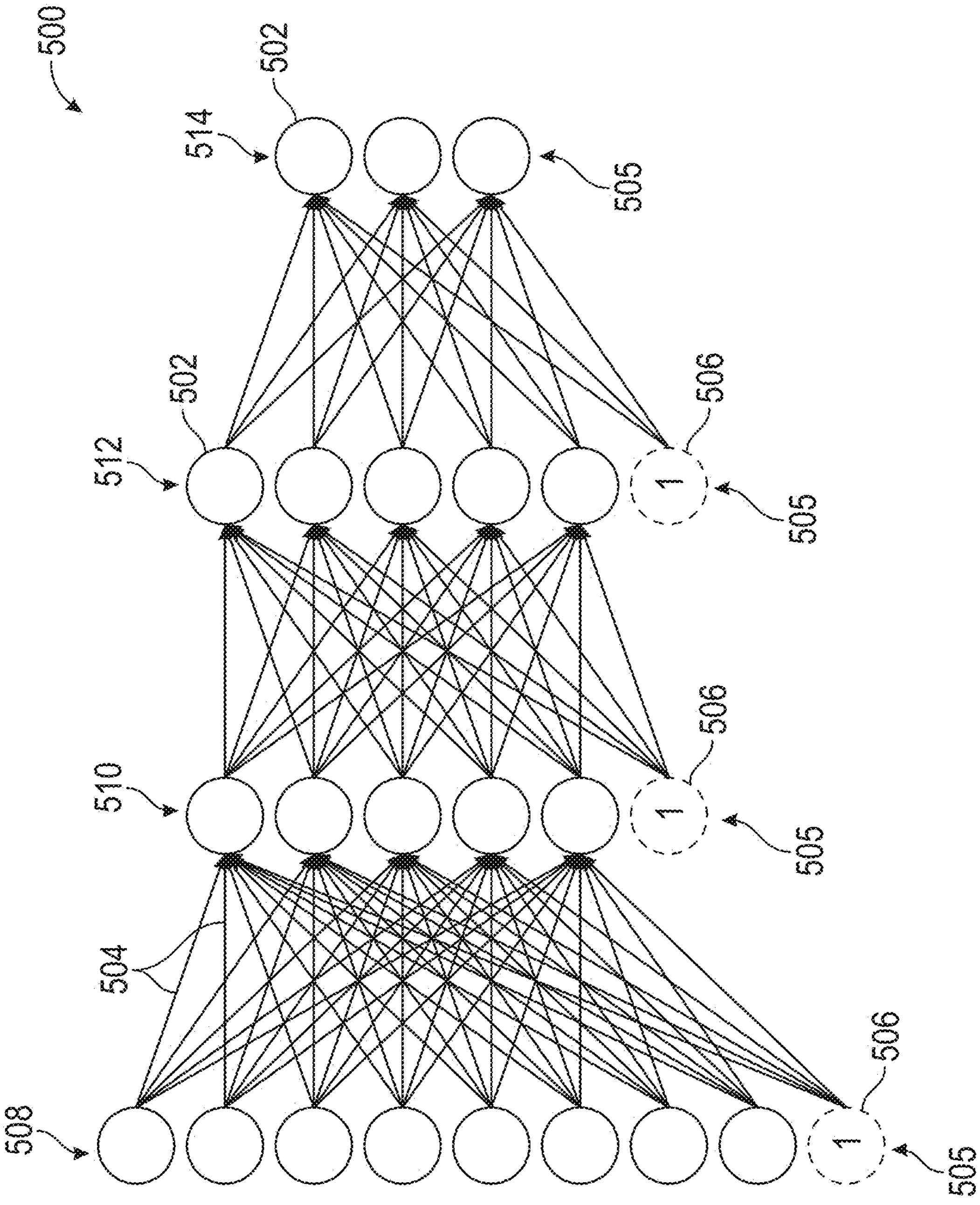
FIG. 5 depicts a neural network in accordance with one or more embodiments.

FIG. 4 depicts an embodiment of training a machine learning (ML) model such as the ML model (387) of FIG. 3. The ML model may be of any ML model type known in the art (for example, a neural network, random forest, support vector machine, algorithm using Gaussian processing, a recurrent neural network, long short-term memory network, self-organizing map, etc.). In some embodiments, multiple ML model types and/or architectures may be used in combination or interchangeably. Generally, the ML model type and architecture with the greatest performance on a set of hold-out data is selected. Greater detail surrounding the training procedure for an ML model will be provided below in the context of a neural network. However, generally, training an ML model involves processing data to develop a functional relationship between elements of the data. In one or more embodiments, the ML model is trained using previously acquired, or historic, modelling data. At training (404), the modelling data is partitioned into ML model training inputs (400) and training outputs (402). The result of the training procedure is a trained ML model (412). The trained ML model (412) may be described as a function relating the inputs (400) and the outputs (402). That is, the ML model may be mathematically represented as outputs=$f$ (inputs), such that given an input (400) the ML model may produce an output (402).

ML model training (404) inputs (400) resemble the type of data the ML model may actually be exposed to during deployment, for example, when being used at a gas processing plant with a gas flaring system to reduce the predicted emission therefrom. The training outputs (402) correspond to a "ground-truth" or known values that correspond to conditions represented by the ML model training inputs (400). For example, the ML model training inputs (400) may include gas management data (380) such as environmental data, feed gas data, and flare stack data. Accordingly, the associated training outputs (402) may include measured (or otherwise known) values characterizing the emission of flare stacks under the conditions described by the gas management data (380). More specifically, the training outputs (402) may describe the substances that were actually emitted as well as their rates of emission. Thus, the ML model is trained (404) to determine the mapping between the ML model training inputs (400), which in this case is gas management data (380), and the training outputs (402), which in this case includes measured characterizing emission. Consider another example. As described previously, during deployment, the ML model may determine a predicted maintenance requirement of the gas processing plant or gas flaring system. During training (404), a ML model input (400) may a record of different maintenances that were applied due to a particular subset of gas management data (380). The corresponding training outputs (402) may therefore include a record of maintenance outcomes to guide the ML model (404) towards more useful maintenance operations or towards the proper scenarios that truly require maintenance. Generally, the ML model training inputs (400) and training outputs (402) are collected over a period of time from the well or may be acquired from analogous wells. However, in one or more embodiments, the training inputs (400) and training outputs (402) are obtained from simulations.

Recall that an emission reduction strategy is executed by adjusting the set of gas management parameters (305). In order to improve the ability of the ML model to determine useful emission reduction strategies (i.e., useful adjustments to the set of gas management parameters (305)), the set of gas management parameters (305) may be optionally included as ML model training inputs (400). However, given that there is a strong correlation between the gas management parameters (305) and the observed gas management data (380), it may not be necessary to include the set of gas management parameters in the ML model training inputs (400).

In one or more embodiments, the trained ML model (412), upon processing an input (400), produces an output (402), namely a predicted emission from the gas flaring system (E). As previously described, the predicted emission may be used to determine an emission reduction strategy. In addition, recall that many of the inputs (400) may be directly influenced by the set of gas management parameters of the well (for example, adjusting the temperature or pressure of the feed gas, or adjusting the air-to-gas ratio in the flare stack). As has been established, the objective of applying the ML model is to lower the predicted emission from the flare stack. Accordingly, the output (402), or predicted emission (E), may be used to inform a change in the set of gas management parameters (305) to have achieve the mitigation, inhibition, or removal of scale. In practice, after training (404), an optimization wrapper (depicted as Block 408) may be used on the trained ML model (412) to invert the model to optimize the set of gas management parameters (305). That is, the optimizer or optimization wrapper may be used to access the ML model, in view of the set of gas management parameters (305), to determine an optimal set of gas management parameters that minimizes the predicted emission (E). After optimization, the command to adjust the set of gas management parameters (305) would then include adjusting the set of gas management parameters (305) to the optimal set of gas management parameters.

The set of gas management parameters (305) may be categorized as gas processing parameters (304) and flaring parameters (308), as previously described in reference to FIG. 3. The gas processing parameters (304) may define, for example, the feed gas temperature, feed gas pressure, feed gas velocity, and parameters of a gas recovery system (if the gas flaring system includes a gas recovery system). The flaring parameters (308) may define, for example, the air-to-gas ratio, the flare tip design, the pressure within the flare stack, the steam-to-gas ratio, the height of the flare, the diameter of the flare, and operation of the ignition device. In most instances, the flare stack will not be able to be modified to adjust the flare height or flare diameter. However, embodiments of the present disclosure may be used in planning flaring systems yet to be built.

Mathematically, the optimization of the set of gas management parameters (305) may take the form:

$$\underset{S_1 S_2}{\arg\min}\, E \quad \text{subject to: device constraints,} \tag{1}$$

where the quantity E, the predicted emission from the gas flaring system, is determined using the trained ML model (412). In this case, it is assumed that the predicted emission includes an amount of emitted substance as either a rate, volume, or mass. Further, in EQ. 1, the gas processing parameters (304) are denoted as $S_1$, and the flaring parameters the are denoted as $S_2$. Collectively $S_1$, and $S_2$, may be part of the set of gas management parameters (305). Thus, the optimization wrapper (408) minimizes the predicted emission (E) over the set of gas management parameters, which may include the gas processing parameters, and the flaring parameters. The optimization may alternatively be expressed as a maximization, for example, a maximization of the inverse of predicted emission (E). One with ordinary skill in the art will appreciate that maximization and minimization may be made equivalent through simple techniques such as negation and inversion. As such, the choice to represent the optimization as a maximization as shown in EQ. 1 does not limit the scope of the present disclosure. Whether done through minimization or maximization, the optimization wrapper (408) identifies the set (or sets) of gas management parameters (305) that minimizes the predicted emission (E).

A gas processing plant or gas flaring system may be subject to constraints, such as safety limits imposed on various devices and sub-processes. For example, it may be determined that in order for a well to operate safely, feed gas pressure or temperature, as measured by the dynamic sensor array, should not exceed a prescribed value. In FIG. 4, the constraints are referenced as device constraints. The optimization wrapper (408) cannot elect any set of gas management parameters (305) that cause any portion of the well to exceed pre-defined device constraints. Additional examples of constraints applied to the optimization may include a predefined maximum allowable amount of air or steam injection and feed gas volume ratios. As previously described, the flaring parameters (308) may define the flare height and flare diameter. However, for flare stacks that are already constructed, the height and diameter of the flare likely cannot be changed. Accordingly, a device constraint may require the flare height and flare diameter to remain fixed. Embodiments of the instant disclosure further allow for distributed decision making. For example, decisions regarding the modification of different parameters may be made independent of each other, for example, adjusting the gas processing parameters (304) and the flaring parameters (308). In one or more embodiments, decision-based constraints and distributed decision strategies are accounted for during optimization (e.g., through constraints of the decoupling or independence of various gas processing parameters (304) and flaring parameters (308).)

In accordance with one or more embodiments, the ML model discussed herein may be an artificial neural network ("neural network"). A diagram of a neural network is shown in FIG. 5. At a high level, a neural network (500) may be graphically depicted as being composed of nodes (502), where here any circle represents a node, and edges (504), shown here as directed lines. The nodes (502) may be grouped to form layers (505). FIG. 5 displays four layers (508, 510, 512, 514) of nodes (502) where the nodes (502) are grouped into columns, however, the grouping need not be as shown in FIG. 5. The edges (504) connect the nodes (502). Edges (504) may connect, or not connect, to any node(s) (502) regardless of which layer (505) the node(s) (502) is in. That is, the nodes (502) may be sparsely and residually connected. A neural network (500) will have at least two layers (505), where the first layer (508) is considered the "input layer" and the last layer (514) is the "output layer." Any intermediate layer (510, 512) is usually described as a "hidden layer". A neural network (500) may have zero or more hidden layers (510, 512) and a neural network (500) with at least one hidden layer (510, 512) may be described as a "deep" neural network or as a "deep learning method." In general, a neural network (500) may have more than one node (502) in the output layer (514). In this case the neural network (500) may be referred to as a "multi-target" or "multi-output" network.

Nodes (502) and edges (504) carry additional associations. Namely, every edge is associated with a numerical value. The edge numerical values, or even the edges (504) themselves, are often referred to as "weights" or "parameters." While training a neural network (500), numerical values are assigned to each edge (504). Additionally, every node (502) is associated with a numerical variable and an activation function. Activation functions are not limited to any functional class, but traditionally follow the form:

$$A = f\left(\sum_{i \in (incoming)} [(\text{node value})_i (\text{edge value})_i]\right), \tag{2}$$

where i is an index that spans the set of "incoming" nodes (502) and edges (504) and $f$ is a user-defined function. Incoming nodes (502) are those that, when viewed as a graph (as in FIG. 5), have directed arrows that point to the node (502) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (502) in a neural network (500) may have a different associated activation function. Often, as a shorthand, activation functions are described by the function $f$ by which it is composed. That is, an activation function composed of a linear function $f$ may simply be referred to as a linear activation function without undue ambiguity.

When the neural network (500) receives an input, the input is propagated through the network according to the activation functions and incoming node (502) values and edge (504) values to compute a value for each node (502). That is, the numerical value for each node (502) may change for each received input. Occasionally, nodes (502) are assigned fixed numerical values, such as the value of 1, that are not affected by the input or altered according to edge (504) values and activation functions. Fixed nodes (502) are often referred to as "biases" or "bias nodes" (506), displayed in FIG. 5 with a dashed circle.

In some implementations, the neural network (500) may contain specialized layers (505), such as a normalization layer, or additional connection procedures, like concatenation. One skilled in the art will appreciate that these alterations do not exceed the scope of this disclosure.

As noted, the training procedure for the neural network (500) comprises assigning values to the edges (504). To begin training the edges (504) are assigned initial values. These values may be assigned randomly, assigned according to a prescribed distribution, assigned manually, or by some other assignment mechanism. Once edge (504) values have been initialized, the neural network (500) may act as a function, such that it may receive inputs and produce an output. As such, at least one input is propagated through the neural network (500) to produce an output. Recall, that a given data set will be composed of inputs and associated target(s), where the target(s) represent the "ground truth," or the otherwise desired output. In accordance with one or more embodiments, the input of the neural network (500) is the gas management data, which may include environmental data, feed gas data, and flare stack data. In other embodiments, the input of the neural network may also include the set of gas management parameters. The corresponding outputs or target is the predicted emission of the flare stack. The corresponding outputs or target may also include an emission reduction strategy.

During training, the neural network (500) output is compared to the associated input data target(s). For example, in a training scenario, real measured emission values (e.g., types of emitted substances and their associated volumes or rate of emission) are compared with predicted emission values based on the ML model inputs (i.e., the gas management data and optionally the set of gas management parameters). The comparison of the neural network (500) output to the target(s) is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (500) output and the associated target(s). The loss function may also be constructed to impose additional constraints on the values assumed by the edges (504), for example, by adding a penalty term, which may be physics-based, or a regularization term. Generally, the goal of a training procedure is to alter the edge (504) values to promote similarity between the neural network (500) output and associated target(s) over the data set. Thus, the loss function is used to guide changes made to the edge (504) values, typically through a process called "backpropagation."

While a full review of the backpropagation process exceeds the scope of this disclosure, a brief summary is provided. Backpropagation consists of computing the gradient of the loss function over the edge (504) values. The gradient indicates the direction of change in the edge (504) values that results in the greatest change to the loss function. Because the gradient is local to the current edge (504) values, the edge (504) values are typically updated by a "step" in the direction indicated by the gradient. The step size is often referred to as the "learning rate" and need not remain fixed during the training process. Additionally, the step size and direction may be informed by previously seen edge (504) values or previously computed gradients. Such methods for determining the step direction are usually referred to as "momentum" based methods.

Once the edge (504) values have been updated, or altered from their initial values, through a backpropagation step, the neural network (500) will likely produce different outputs. Thus, the procedure of propagating at least one input through the neural network (500), comparing the neural network (500) output with the associated target(s) with a loss function, computing the gradient of the loss function with respect to the edge (504) values, and updating the edge (504) values with a step guided by the gradient, is repeated until a termination criterion is reached. Common termination criteria are: reaching a fixed number of edge (504) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (504) values are no longer intended to be altered, the neural network (500) is said to be "trained."

While embodiments discussing ML model type have mostly focused on artificial neural networks, one skilled in the art will appreciate that this process, of determining a predicted emission of a gas flaring system and determining an emission reduction strategy based on the predicted emission, is not limited to the listed ML models. ML models such as random forests, support vector machines, or non-parametric methods such as K-nearest neighbors may be readily inserted into this framework and do not depart from the scope of this disclosure. In addition, a person of ordinary skill in the art will appreciate that embodiments of the present disclosure may include computational models that do not use ML models. That is, in one or more embodiments, the predicted emission and emission reduction strategy may be determined using an empirical look-up table of gas management data corresponding to different conditions. Alternatively, or in addition, mathematical inference techniques and regression analysis may be applied to the gas management data.

In one or more embodiments, the ML model used herein may be specifically designed to handle time-series data such as the gas management data. Examples of ML models used to analyze time series data include recurrent neural networks, long short-term memory networks, and transformers. In one or more embodiments, the ML model used herein is a temporal convolutional neural network (TCN). Generally, TCNs are one-dimensional convolutional neural networks. TCNs function similar to other ML models that handle sequences, in that the input to the TCN is a sequence and the output from the TCN is another sequence. Accordingly, the TCN may represent a function such that for every element in a sequence (where each element corresponds to a particular moment in time), the function predicts another element, collectively forming a new sequence. A key feature of TCNs, in comparison to other types of convolutional neural networks is that they are "causal" meaning that sequence elements are predicted using only elements that precede the index of the predicted elements. For example, a given sequence may be represented as $(a_1, a_2, \ldots, a_t)$ where t represents an index for moments in time. The predicted sequence may be represented as $(b_1, b_2, \ldots, b_t)$. The prediction of the element $b_{t-1}$ depends only on elements $a_{t-1}$ and earlier (i.e., not on $a_t$ or beyond), and the network is not able to look forward in time. Often, this is realistic of real-world scenarios, where a prediction must be made about the future using only information about the present and the past. TCNs have several advantages, such as being able to operate with parallelization, utilize large receptive fields (i.e., long sequences representing large amounts of time), have stable gradients, do not require significant memory, and use residual connections to enhance learning speeds.

Figure 6:
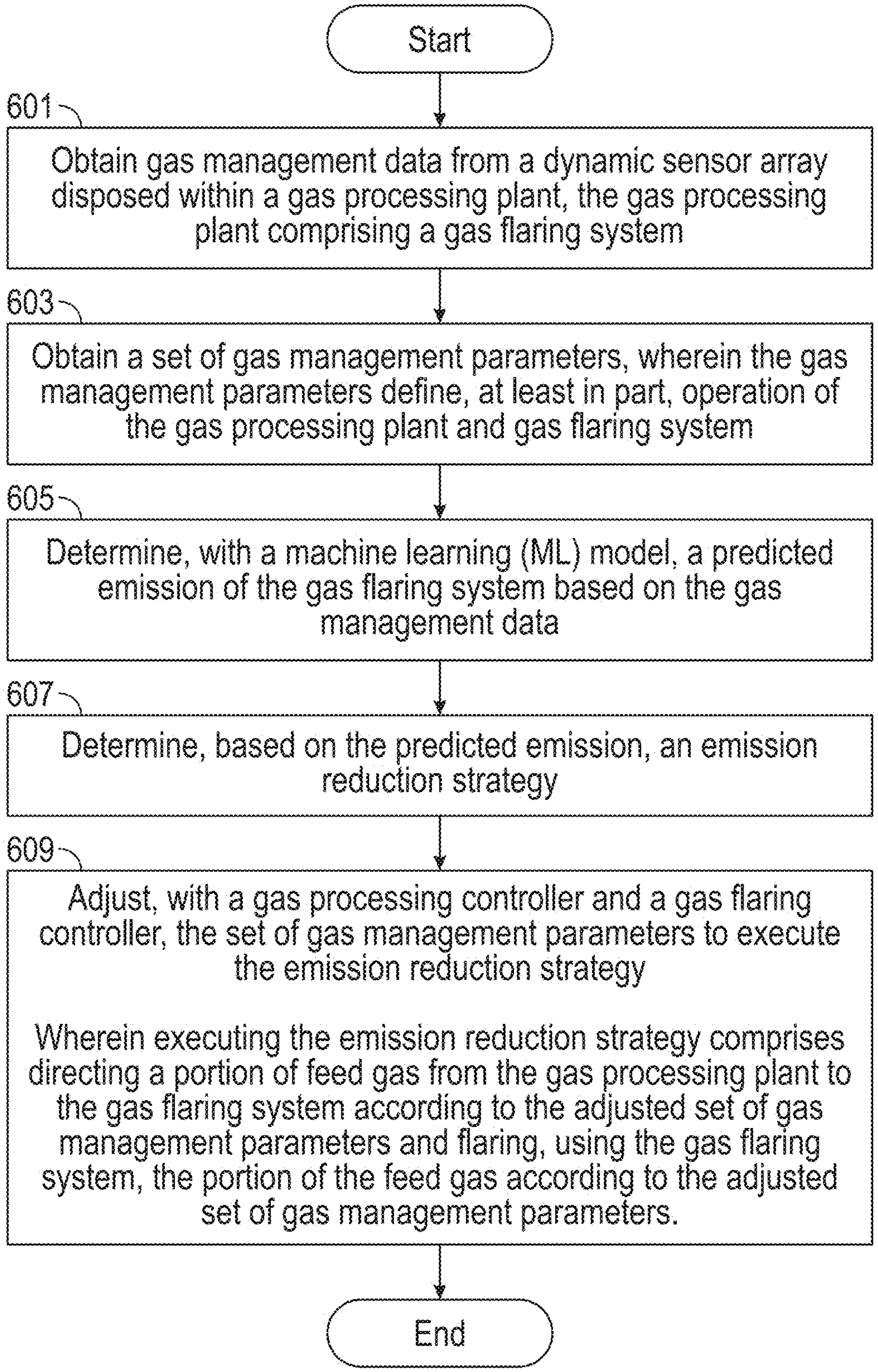
FIG. 6 depicts a flowchart in accordance with one or more embodiments.

The process of evaluating gas management data from a gas processing plant and gas flaring system and predicting emission from the gas flaring system is summarized in the flow chart of FIG. 6. In Block 601, gas management data may be obtained from a dynamic sensor array disposed within a gas processing plant. The gas processing plant may include a gas flaring system. The gas management data may include environmental data, feed gas data, and flare stack data. Environmental data include measurements of the environment in the vicinity of the gas flaring system that may affect gas flaring operations. For example, the environmental data may include ambient temperature, precipitation and humidity, and wind speed, among other possible measurements. Feed gas data describes properties of the feed gas that reaches the flare stack of the gas flaring system. Feed gas data may include measurements of feed gas pressure, flow rate, temperature, and composition. Flare stack data describes properties of the flare stack in the gas flaring system. Flare stack data may include combustion data indicating the temperature, pressure, and flow rate of combusting material in the flare stack, ignition data describing aspects of the pilot flame such as its height, diameter, and sparking efficiency, and injection support data describing the amount of steam and air injected (e.g., as a volumetric rate or integrated volume over a predetermined amount of time) into the flare stack to support burning.

In one or more embodiments, the gas management data are pre-processed. Pre-processing may include numericalizing the data, scaling the data, selecting features from the data, and engineering features from the data.

In Block 603, a set of gas management parameters may be obtained that define, at least in part, the operation of the gas processing plant and gas flaring system. The set of gas management parameters may include gas processing parameters and flaring parameters. The gas processing parameters may define the state of control valves, fluid levels, pipe pressures, heat exchangers, warning alarms, and/or pressure releases throughout the gas processing plant. Alternatively, or in addition, the gas processing parameters may define the state of control valves, fluid levels, pipe pressures, heat exchangers, warning alarms, and/or pressure releases throughout the gas flaring system. In either case, manipulating the gas processing parameters may result in changing qualities of the feed gas that reaches the gas flaring system. The flaring parameters may define the state of control valves, fluid levels, pipe pressures, heat exchangers, gas pumps, warning alarms, and/or pressure releases throughout the flare stack. The flaring parameters may also define the state of control for devices associated with the flare stack and pilot flame, such as injectors and pumps responsible for providing steam, air, and fuel to the flare tip and the sparking device. Similar to the gas processing parameters, manipulating the flaring parameters may result in changing how gas is flared. In most instances, the gas flaring system is part of the gas processing plant and therefore a person of ordinary skill in the art will appreciate that there may be overlap between parameters categorized as gas processing parameters and flaring parameters. In addition, in one or more embodiments, the set of gas management parameters may be categorized or grouped differently.

In Block 605, a predicted emission of the gas flaring system may be determined based on the gas management data using a machine learning (ML) model. Various embodiments of the ML model have been described, for example, in FIGS. 4 and 5. The ML model outputs a prediction of the emission from the gas flaring system given the gas management data. The predicted emission of the gas flaring system may include a classification of the substance that is emitted as a result of flaring, for example, carbon dioxide (CO2), methane (CH4), black soot (or other particulates), nitrous oxide, and other pollutants such as sulfur dioxide, volatile organic compounds (VOCs), and trace metals. In addition to a classification, the prediction emission may include an associated rate of emission for each substance emitted (e.g., as a volume or mass emitted per unit time). Each classified substance that is predicted to be emitted, as part of the predicted emission, may also have an associated probability or likelihood describing the uncertainty associated with the prediction.

In Block 607, an emission reduction strategy may be determined based on the predicted emission. The emission reduction strategy describes a method or process to reduce predicted emission by changing the operation of the gas processing plant or the gas flaring system. More specifically, the emission reduction strategy entails an adjustment to the operation of the gas processing plant or gas flaring system by adjusting the set of gas management parameters. Emission from gas flaring is dependent on many factors including the feed gas composition, the air-to-gas ratio within the flare stack at the time of flaring, the design of the flare tip, the pressure inside the flare stack, the steam-to-gas ratio inside the flare stack, the flare stack height and diameter, the operational capacity of the gas recovery system (if the gas flaring system includes a gas recovery system), and operation of the ignition system in the flare stack. A person of ordinary skill in the art will appreciate that additional factors may influence the emission from gas flaring. For a given gas processing plant and gas flaring system, one or more of the aforementioned factors may be configurable according to the set of gas management parameters. In one or more embodiments, the emission reduction strategy is determined by the ML model based on the predicted emission. In other embodiments the emission reduction strategy is determined based on the predicted emission by a human in-the-loop.

In Block 609, a gas processing controller and gas flaring controller may be used to adjust the set of gas management parameters to new values to execute the emission reduction strategy. Any such adjustment may be performed automatically and autonomously, or may be done manually, or may be checked by a "human-in-the-loop." Generally, executing the emission reduction strategy includes directing a portion of feed gas from the gas processing plant to the gas flaring system according to the adjusted set of gas management parameters, and flaring, using the flaring system, the portion of the feed gas according to the adjusted set of gas management parameters. For example, flaring parameters, which may be part of the set of gas management parameters, may define and control the steam-to-gas ratio or the air-to-gas ratio (or both) inside the flare stack. Accordingly, an example emission reduction strategy may include adjusting the flaring parameters to increase an amount of air injected into the gas flaring system to improve combustion efficiency. As another example, the emission reduction strategy may include adjusting the steam-to-gas ratio inside the flare stack to reduce the amount of smoke and particulate matter emitted into the environment. As a further example, the gas processing parameters may define a pressure of the feed gas, which may affect the predicted emission. Accordingly, an example emission reduction strategy may include adjusting the feed gas pressure to reduce emission. A person of ordinary skill in the art will appreciate that additional emission reduction strategies are possible depending on the set of gas management parameters.

The steps depicted in FIG. 6 may be repeated arbitrarily numerous times, in accordance with one or more embodiments. In other words, the steps depicted in FIG. 6 may be repeated to obtain new determinations of the predicted emission and different emission reduction strategies for the gas processing plant and gas flaring system as conditions change over time. By repeatedly executing the steps of FIG. 6, the methods and systems of the present disclosure may continuously minimize emission from the gas flaring system.

One with ordinary skill in the art will recognize that many alterations can be readily applied to the system and methods disclosed herein. Embodiments of the present disclosure may provide at least one of the following advantages. The methods and systems of the present disclosure include dynamic, machine learning-based techniques capable of calibrating measurements over time for improved accuracy. Ordinary sensors used to monitor gas flaring may be biased or may only perform well under specific conditions (e.g., they may perform well assuming a constant flow rate, or a constant gas composition). However, the conditions within a gas flaring system are known to vary significantly. By contrast, embodiments of the present disclosure use a dynamic sensor array in conjunction with a machine learning (ML) model to determine the predicted emission from the gas flaring system. By continuously obtaining new gas management data from the dynamic sensor array, the ML model can refine predictions and adjust the interpretation of the measurements provided by the dynamic sensor array. Moreover, the prediction is capable of adjusting to the strongly varying conditions expected within a gas flaring system. Embodiments of the present disclosure are also scalable and easily integrated with existing systems.

Because the dynamic sensor array is composed of modular units of different sensors (e.g., temperature, composition, pressure, and flowrate sensors), the dynamic sensor array may be enlarged disposed as needed according to the gas processing plant and gas flaring system.

Embodiments of the present disclosure offer comprehensive carbon emission tracking for environmental compliance. As previously described, a predetermined emission threshold may be set on the predicted emission from the gas flaring system. Each time the predicted emission of the gas flaring system is determined, it may be compared with the predetermined emission threshold. In the event that the predicted emission exceeds the predetermined emission threshold, an emission alert may be transmitted. The emission alert may be transmitted to an operator, management personnel, nearby facilities, and environmental regulatory agencies. In this way, the systems and methods of the present disclosure aids environmental protection.

Embodiments of the present disclosure are capable of predicting maintenance to foresee system issues. Consequently, the system and methods of the present disclosure may be used to reduce maintenance costs.

Figure 7:
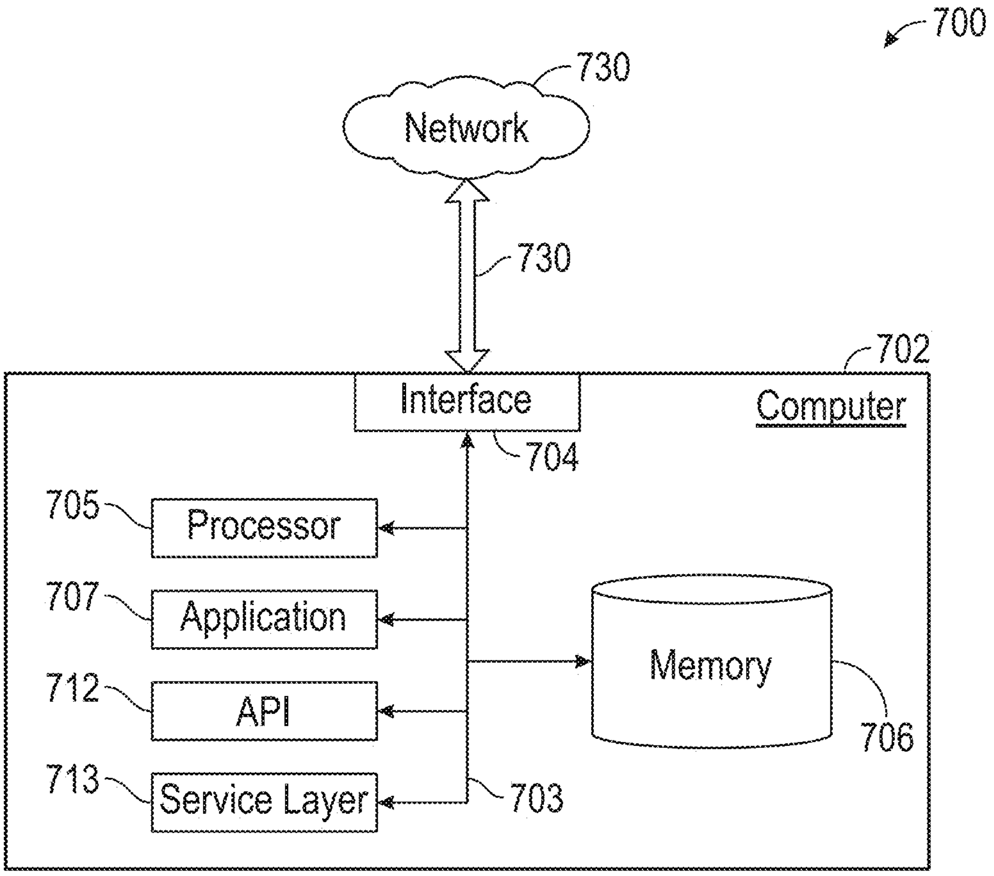
FIG. 7 depicts a system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device such as an edge computing device, including both physical or virtual instances (or both) of the computing device. An edge computing device is a dedicated computing device that is, typically, physically adjacent to the process or control with which it interacts. For example, the ML model may be implemented on an edge computing device.

Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). The memory may be a non-transitory computer readable medium. For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for performing gas flaring, comprising:

obtaining gas management data from a dynamic sensor array disposed within a gas processing plant, the gas processing plant comprising a gas flaring system;

obtaining a set of gas management parameters, wherein the set of gas management parameters define, at least in part, operation of the gas processing plant and gas flaring system;

determining, with a machine learning (ML) model, a predicted emission of the gas flaring system based on the gas management data;

determining, based on the predicted emission, an emission reduction strategy; and adjusting, with a gas processing controller and a gas flaring controller, the set of gas management parameters to execute the emission reduction strategy;

wherein executing the emission reduction strategy comprises directing a portion of feed gas from the gas processing plant to the gas flaring system according to the adjusted set of gas management parameters and flaring, using the gas flaring system, the portion of the feed gas according to the adjusted set of gas management parameters.

2. The method of claim 1, further comprising:

determining whether the predicted emission is greater than a predetermined emission threshold and transmitting an emission alert in response to the determination that the predicted emission is greater than the predetermined emission threshold.

3. The method of claim 2, wherein the predicted emission is repeatedly determined, and the emission reduction strategy is repeatedly executed by adjusting the set of gas management parameters.

4. The method of claim 1, wherein the gas management data comprises feed gas data characterizing the feed gas.

5. The method of claim 4, wherein the feed gas data comprises a composition of the feed gas.

6. The method of claim 1:

wherein the set of gas management parameters comprises flaring parameters, wherein the flaring parameters define, at least in part, operation of the gas flaring system.

7. The method of claim 6, wherein the emission reduction strategy comprises adjusting the flaring parameters to increase or decrease an amount of air injected into the gas flaring system to improve combustion efficiency.

8. The method of claim 1, further comprising:

determining, using an optimizer accessing the ML model in view of the set of gas management parameters, a set of optimal gas management parameters that minimizes the predicted emission, wherein adjusting the set of gas management parameters comprises adjusting the set of gas management parameters to the set of optimal gas management parameters.

9. The method of claim 1, further comprising determining, using the ML model, a predicted maintenance for the gas processing plant or gas flaring system based on the gas management data.

10. A system for performing gas flaring at a gas processing plant comprising a gas flaring system, the system comprising:

a gas processing controller communicatively coupled to the gas processing plant;

a gas flaring controller communicatively coupled to the gas flaring system;

wherein the gas processing controller and gas flaring controller are configured to adjust a set of gas management parameters, the set of gas management parameters defining, at least in part, operation of the gas processing plant and gas flaring system;

a dynamic sensor array disposed within the gas processing plant and gas flaring system, the dynamic sensor array configured to obtain gas management data from the gas processing plant and gas flaring system; and a computer communicatively coupled to the dynamic sensor array, the gas processing controller, and the gas flaring controller, wherein the computer is configured to:

receive the gas management data from the dynamic sensor array, determine, with a machine learning (ML) model, a predicted emission of the gas flaring system based on the gas management data, determine, based on the predicted emission, an emission reduction strategy, and adjust, using the gas processing controller and the gas flaring controller, the set of gas management parameters to execute the emission reduction strategy, wherein executing the emission reduction strategy comprises directing a portion of feed gas from the gas processing plant to the gas flaring system according to the adjusted set of gas management parameters and flaring, using the gas flaring system, the portion of the feed gas according to the adjusted set of gas management parameters.

11. The system of claim 10, wherein the computer is further configured to:

determine whether the predicted emission is greater than a predetermined emission threshold and transmit an emission alert in response to the determination that the predicted emission is greater than the predetermined emission threshold.

12. The system of claim 11, wherein the predicted emission is repeatedly determined, and the emission reduction strategy is repeatedly executed by adjusting the set of gas management parameters.

13. The system of claim 10, wherein the gas management data comprises feed gas data characterizing the feed gas.

14. The system of claim 13, wherein the feed gas data comprises a composition of the feed gas.

15. The system of claim 10:

wherein the set of gas management parameters comprises flaring parameters, wherein the flaring parameters define, at least in part, operation of the gas flaring system.

16. The system of claim 15, wherein the emission reduction strategy comprises adjusting the flaring parameters to increase or decrease an amount of air injected into the gas flaring system to improve combustion efficiency.

17. The system of claim 10, wherein the computer is further configured to:

determine, using an optimizer accessing the ML model in view of the set of gas management parameters, a set of optimal gas management parameters that minimizes the predicted emission, wherein adjusting the set of gas management parameters comprises adjusting the set of gas management parameters to the set of optimal gas management parameters.

18. The system of claim 10, wherein the computer is further configured to determine, using the ML model, a predicted maintenance for the gas processing plant or gas flaring system based on the gas management data.

19. A non-transitory computer-readable memory comprising computer-executable instructions stored thereon that, when executed on a processor, cause the processor to perform steps comprising:

receiving gas management data from a dynamic sensor array disposed within a gas processing plant comprising a gas flaring system;

receiving a set of gas management parameters, wherein the set of gas management parameters define, at least in part, operation of the gas processing plant and gas flaring system;

determining, with a machine learning (ML) model, a predicted emission of the gas flaring system based on the gas management data;

determining, based on the predicted emission, an emission reduction strategy; and adjusting, with a gas processing controller and a gas flaring controller, the set of gas management parameters to execute the emission reduction strategy;

wherein executing the emission reduction strategy comprises directing a portion of feed gas from the gas processing plant to the gas flaring system according to the adjusted set of gas management parameters and flaring, using the gas flaring system, the portion of the feed gas according to the adjusted set of gas management parameters.

20. The non-transitory computer readable memory of claim 19, wherein the steps further comprise:

determining whether the predicted emission is greater than a predetermined emission threshold and transmitting an emission alert in response to the determination that the predicted emission is greater than the predetermined emission threshold.

* * * * *